United States Patent [19]

Murao et al.

[11] Patent Number: 5,687,146
[45] Date of Patent: Nov. 11, 1997

[54] FOCUS CONTROL DEVICE FOR USE WITH AN OPTICAL PICKUP COMPRISING A REFRACTING MEANS

[75] Inventors: Noriaki Murao; Takanori Maeda, both of Tokorozawa, Japan

[73] Assignee: Pioneer Electronic Corporation, Tokyo, Japan

[21] Appl. No.: 229,442

[22] Filed: Apr. 13, 1994

Related U.S. Application Data

[63] Continuation of Ser. No. 974,192, Nov. 10, 1992, abandoned.

[30] Foreign Application Priority Data

Nov. 15, 1991 [JP] Japan .................... 3-300709

[51] Int. Cl.$^6$ .................................................... G11B 7/00
[52] U.S. Cl. .................... 369/44.23; 369/44.41; 369/112; 369/120; 369/44.42; 250/201.5
[58] Field of Search ...................... 369/44.23, 44.41, 369/112, 120, 44.42, 44.37; 250/201.5

[56] References Cited

U.S. PATENT DOCUMENTS

| | | | |
|---|---|---|---|
| 3,865,996 | 2/1975 | Kato | 369/103 |
| 4,006,293 | 2/1977 | Bouwhuis | 369/44.42 |
| 4,709,139 | 11/1987 | Nakamura et al. | 369/44.23 |
| 4,866,694 | 9/1989 | Korth | 369/120 X |
| 4,897,828 | 1/1990 | Yoshitoshi | 369/44.42 |
| 4,993,011 | 2/1991 | Torazawa | 369/44.37 |
| 5,084,783 | 1/1992 | Dewey et al. | 369/44.23 X |
| 5,107,102 | 4/1992 | Noda et al. | 250/201.5 |
| 5,237,556 | 8/1993 | Pierce | 369/44.23 |
| 5,291,471 | 3/1994 | Russell | 369/44.26 |
| 5,386,410 | 1/1995 | Nagasaki et al. | 369/111 X |
| 5,559,773 | 9/1996 | Kentatsu et al. | 369/44.41 |

*Primary Examiner*—Aristotelis M. Psitos
*Assistant Examiner*—Alan Faber
*Attorney, Agent, or Firm*—Sughrue,Mion,Zinn,Macpeak & Seas, PLLC

[57] ABSTRACT

An optical pickup for reading information recorded on a recording surface of an optical information storage medium such as a compact disc or a laser video disc has a light beam source for emitting a linear light beam, and an optical system including an objective lens for converging the linear light beam as a linear image on the recording surface and collecting and emitting a light beam reflected from the recording surface. A focus control device includes a parallel flat glass plate for refracting the reflected light beam from the optical system, a photodetector having a plurality of photosensitive surfaces for photoelectrically converting the light beam applied thereto from the parallel flat glass plate into a plurality of respective detected signals, an error signal generator for processing the detected signals from the photodetector into a focus error signal indicative of whether the linear image is focused on the recording surface at the focal point of the objective lens, and an actuator responsive to the focus error signal for controlling the objective lens positionally with respect to the optical information storage medium to focus the linear image on the recording surface.

21 Claims, 15 Drawing Sheets

FIG.IO(A1) 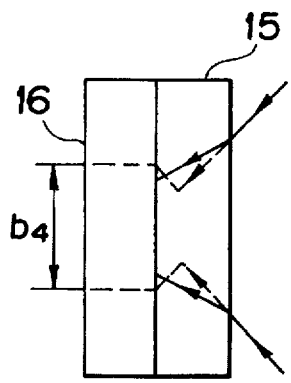
FIG.IO(A2) 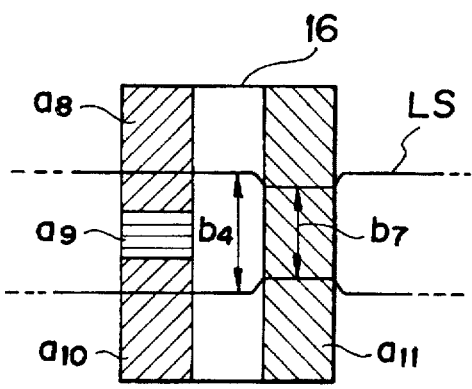
FIG.IO(B1) 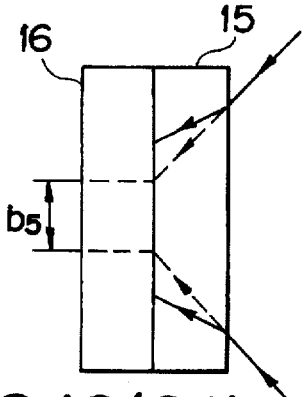
FIG.IO(B2) 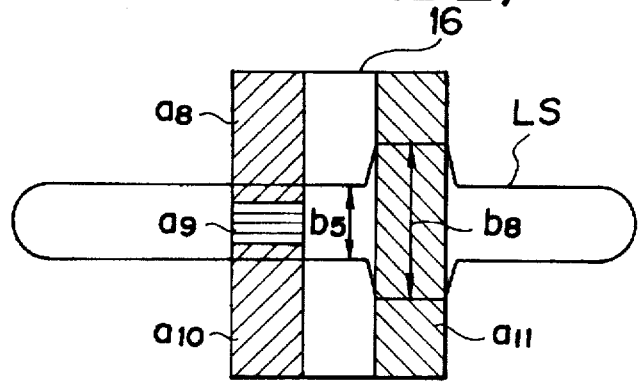
FIG.IO(C1) 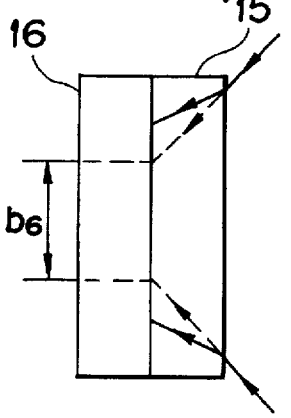
FIG.IO(C2) 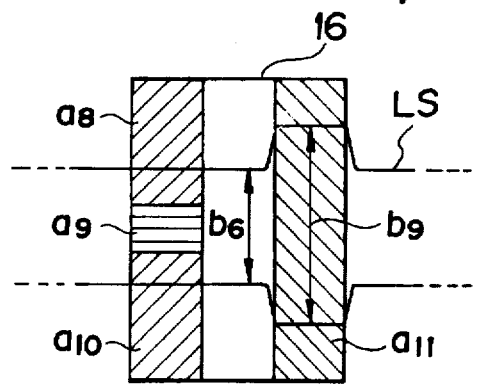

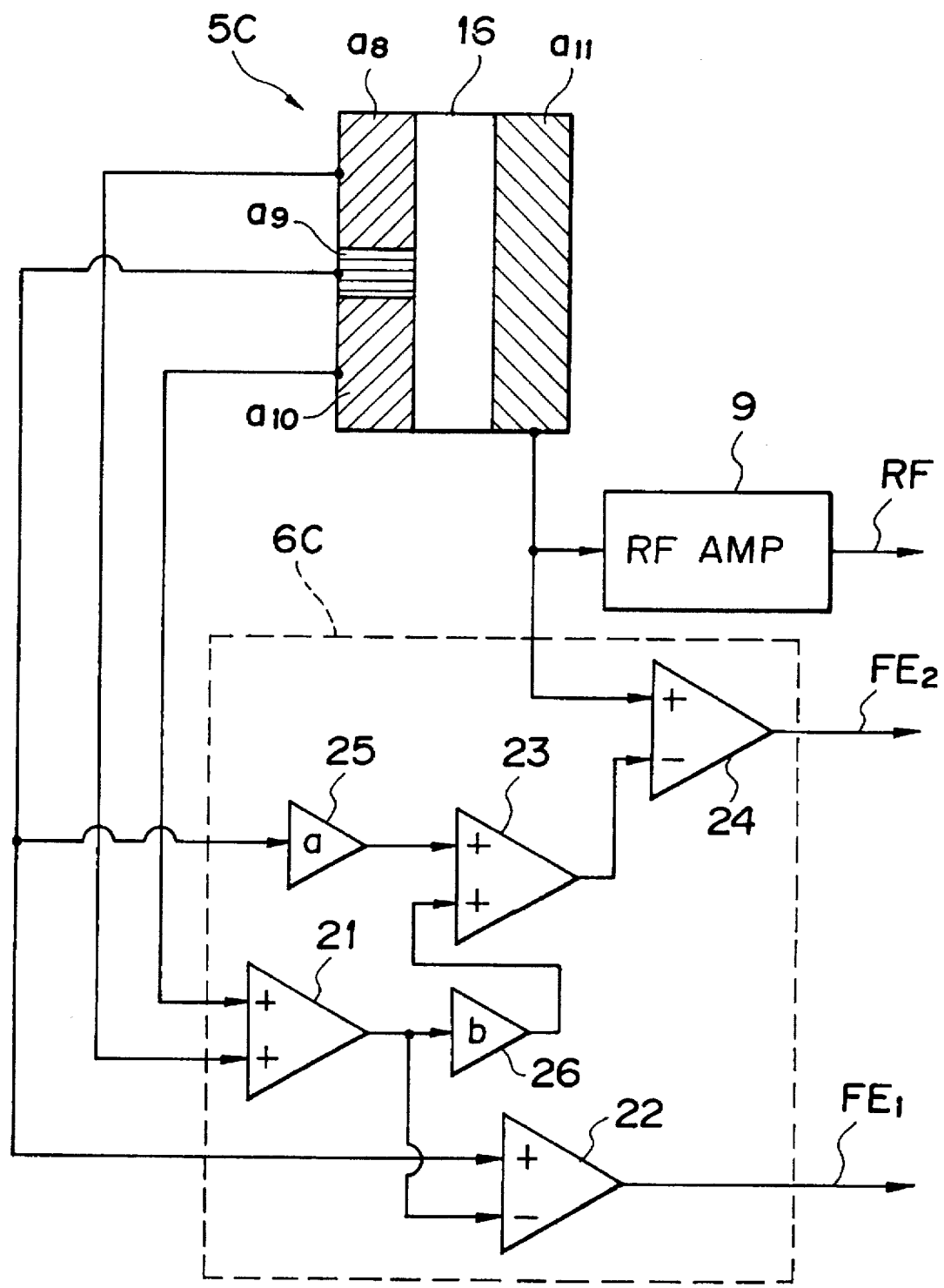

FOCUS CONTROL DEVICE FOR USE WITH AN OPTICAL PICKUP COMPRISING A REFRACTING MEANS

This is a continuation of application Ser. No. 07/974,192 filed Nov. 10, 1992 now abandoned.

BACKGROUND OF THE INVENTION

1. Field of the Invention

The present invention relates to a focus control device for use in an optical pickup for reading recorded information from an optical information storage medium such as a compact disc, a laser video disc, or the like.

2. Description of the Prior Art

Optical pickups for reading recorded information from an optical information storage medium such as a compact disc, a laser video disc, or the like have a focus control device for focusing a light beam emitted from a light source onto the recording surface of an optical information storage medium.

FIG. 1 of the accompanying drawings shows a focus control device in such an optical pickup. As shown in FIG. 1, the focus control device, generally designated by the reference numeral 101, has a semiconductor laser 31 for emitting a laser beam, a beam splitter 32 for reflecting the laser beam toward an optical disc DK, a collimator lens 33 for converting the laser beam from the beam splitter 32 into a parallel laser beam, and an objective lens 34 for converging the parallel laser beam from the collimator lens 33 as a beam spot onto a recording surface $S_2$ of the optical disc DK.

The focus control device 101 also has a half-silvered mirror 35 for dividing a beam which has been reflected by the recording surface $S_2$, traveled back through the objective lens 34 and the collimator lens and passed through the beam splitter 32, into two beams, one transmitted through the half-silvered mirror 35 and one reflected by the half-silvered mirror 35, a four-segment photodetector 38 for detecting and photoelectrically converting one of the two beams which has been transmitted through the half-silvered mirror 35 into a detected electric signal, an error generator 39 for generating a focus error signal indicating whether the laser beam focuses on the recording surface $S_2$, based on the detected electric signal from the four-segment photodetector 38, a driver 40 for producing a drive signal based on the focus error signal from the error generator 39, and an actuator 41 responsive to the drive signal for controlling the position of the objective lens 34 with respect to the optical disc DK, i.e., the distance between the optical disk DK and the objective lens 34.

The other beam reflected by the half-silvered mirror 35 is detected by a photodetector 36 and photoelectrically converted thereby into an RF (radio frequency) signal that represents the information recorded on the optical disc DK. The RF signal from the photodetector 36 is amplified at a suitable gain by an RF amplifier 37, which applies the amplified RF signal to a signal demodulator (not shown).

The half-silvered mirror 35 imparts an intentionally large astigmatism to the beam that has been transmitted through the half-silvered mirror 35. The photodetector 38 is positioned such that the beam spot applied to its photosensitive surfaces represents a least circle of confusion when the beam spot on the recording surface $S_2$ is in focus. If the beam spot on the recording surface $S_2$ is in focus, then the beam spot on the photodetector 38 has a circular intensity distribution as shown in FIG. 2(B). If the beam spot on the recording surface S2 is out of focus, then the beam spot on the photodetector 38 has an elliptical intensity distribution as shown in FIG. 2(A) or 2(C). The major axes of the elliptical shapes shown in FIGS. 2(A) and 2(C) are differently oriented depending on whether the beam spot on the recording surface $S_2$ is overfocused or underfocused. If it is assumed that the photodetector 38 produces detected signals $I_{21}$, $I_{22}$, $I_{23}$, $I_{24}$ respectively from its four photosensitive surfaces $a_{21}$, $a_{22}$, $a_{23}$, $a_{24}$, then the error generator 39 carries out an arithmetic operation indicated by $I=(I_{21}+I_3)-(I_{22}+I_{24})$ to produce the focus error signal. Based on the focus error signal thus generated, the driver 40 applies the drive signal to energize the actuator 41 for enabling the objective lens 34 to focus the beam spot on the recording surface $S_2$.

If the photodetector 36 for detecting the information signal recorded on the optical disc DK were used to produce a focus error signal, no proper focus error signal would be obtained because only the diameter of a circular beam spot on the photodetector 36 would vary when the distance between the optical disc DK and the objective lens 34 varies. While the in-focus condition of the beam spot on the optical disc DK can be determined based on the diameter of the circular spot on the photodetector 36, whether the beam spot is overfocused or underfocused in a defocused condition cannot be determined because the diameter of the circular spot would increase when the distance between the optical disc DK and the objective lens 34 is both longer and shorter than the in-focus distance. Therefore, the photodetector 36 is unable to produce a signal indicative of the direction in which to move the objective lens 34. Since the photodetector 36 is not suitable for producing a focus error signal as described above, two beams are produced by the half-silvered mirror 35, and one of the beams is directed to the photodetector 36 which detects the information signal at the focal plane of the collimator lens 33, whereas the other beam is applied to the four-segment photodetector 38 which generates a focus error signal in a far field. This focus control device is disadvantageous in that it suffers a large light energy loss and is complex in structure because of the two photodetectors required.

SUMMARY OF THE INVENTION

It is an object of the present invention to provide a focus control device for an optical pickup, which is subject to a less light energy loss and simpler in structure.

According to the present invention, there is provided a focus control device for use in an optical pickup for reading information recorded on a recording surface of an optical information storage medium, including a light beam source for emitting a linear light beam, an optical system including an objective lens for converging the linear light beam as a linear image on the recording surface and collecting and emitting a light beam reflected from the recording surface, refracting unit for refracting the reflected light beam emitted from the optical system, photodetecting unit having a plurality of photosensitive surfaces for photoelectrically converting the light beam applied thereto from the refracting unit into a plurality of respective detected signals, processing unit for processing the detected signals from the photodetecting unit into a focus error signal indicative of whether the linear image is focused on the recording surface at the focal point of the objective lens, and control unit responsive to the focus error signal for controlling the objective lens positionally with respect to the optical information storage medium to focus to focus the linear image on the recording surface.

The reflected light beam from the optical system is refracted by the refracting unit and then applied to the photosensitive surfaces of the photodetecting unit. The detected signals from the photodetecting unit are processed by the processing unit into the focus error signal indicative of whether the objective lens is too close to or far from the recording surface of the optical information storage medium when the linear image is defocused on the recording surface. Since the photosensitive surfaces of the photodetecting unit can produce the detected signals using a portion of the reflected light beam applied thereto, the photodetecting unit causes a relatively small light energy loss. In addition, the photodetecting unit is relatively simple in structure.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 6(A2), 6(B2), and 6(C2) are plan views showing the linear beam applied to the photodetector shown in FIGS. 5(A), 5(B), and 5(C);

FIGS. 10(A1), 10(B1), and 10(C1) are side elevational views showing a linear beam applied to the photodetector shown in FIGS. 9(A) and 9(B);

FIGS. 10(A2), 10(B2), and 10(C2) are plan views showing the linear beam applied to the photodetector shown in FIGS. 9(A) and 9(B);

FIG. 11 is a schematic view, partly in block form, of the photodetector, an error generator, and an RF amplifier according to the third embodiment;

FIGS. 13(A2), 13(B2), and 13(C2) are plan views showing the linear beam applied to the photodetector shown in FIG. 12;

DETAILED DESCRIPTION OF THE PREFERRED EMBODIMENTS

Figure 1:
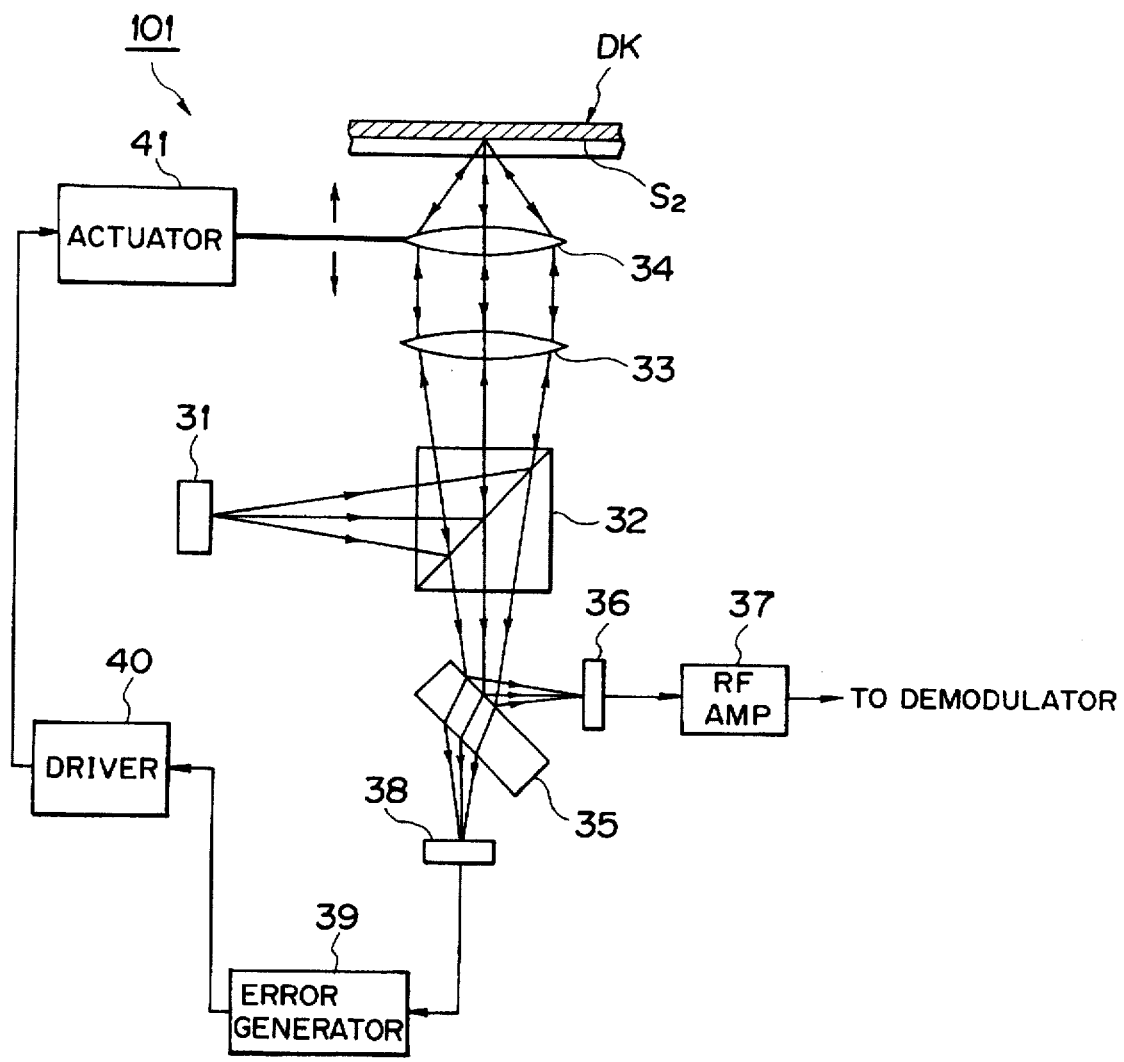
FIG. 1 is a schematic view, partly in block form, of a focus control device in an optical pickup.
Figure 2A:
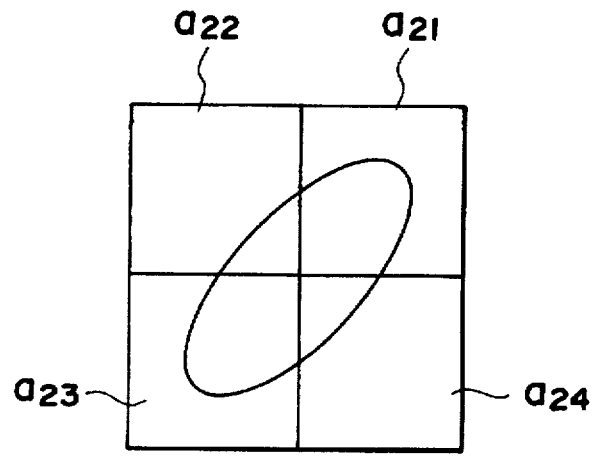
FIGS. 2(A), 2(B), and 2(C) are diagrams showing the manner in which the focus control device operates.
Figure 2B:
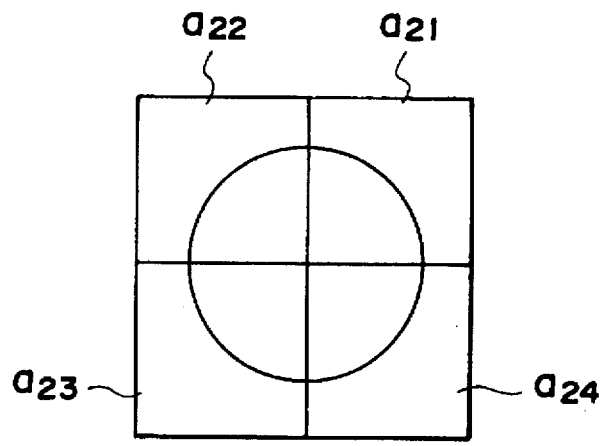
Figure 2C:
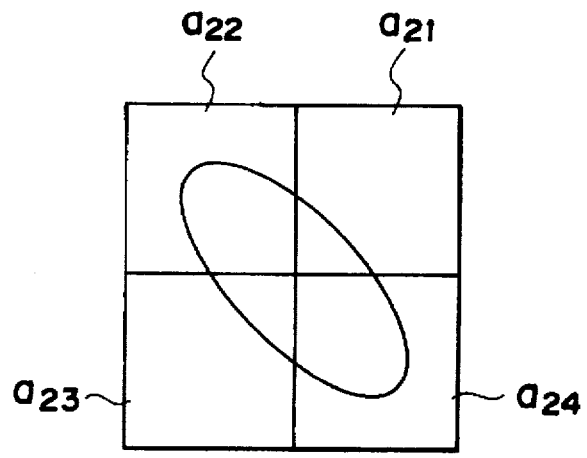
Figure 3:
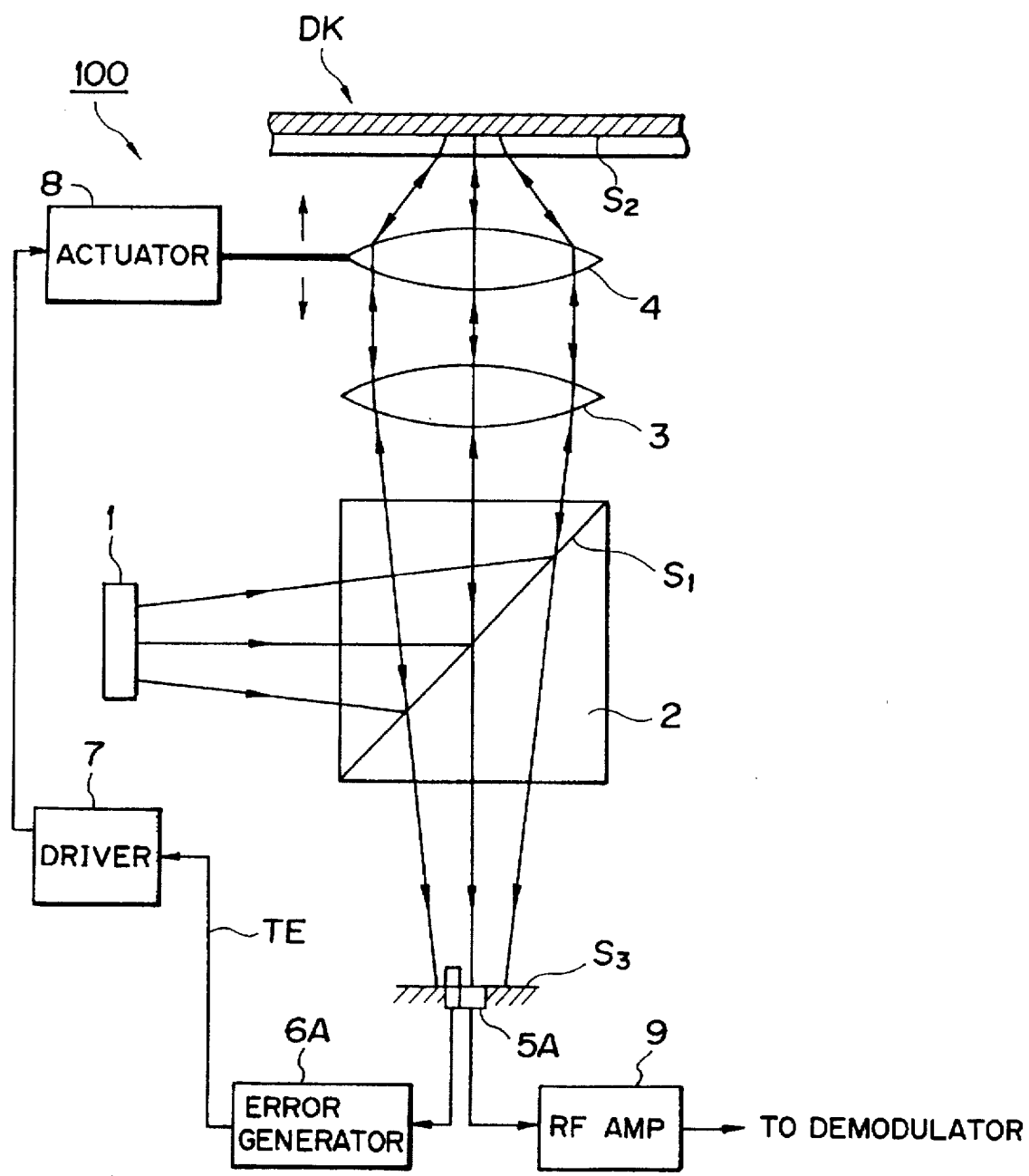
FIG. 3 is a schematic view of a focus control device according to a first embodiment of the present invention.

1st Embodiment:

FIGS. 3 through 7 show a focus control device according to a first embodiment of the present invention. As shown in FIG. 3, the focus control device, generally designated by the reference numeral 100, has a semiconductor laser 1 for emitting a linear laser beam having a predetermined length across its optical axis, a beam splitter 2 having a reflecting surface $S_1$ for reflecting the laser beam from the semiconductor laser 1 toward an optical disc DK as an optical information storage medium, a collimator lens 3 for converting the laser beam from the beam splitter 2 into a parallel laser beam, and an objective lens 4 for converging the parallel laser beam from the collimator lens 3 as a linear shaped image or a linear-shaped beam spot on a recording surface $S_2$ of the optical disc DK.

The focus control device 100 also has a photodetector 5A for detecting a portion of a linear beam which has been reflected by the recording surface $S_2$, traveled back through the objective lens 4 and the collimator lens 3, passed through the reflecting surface $S_1$ in the beam splitter 32, and reached a surface $S_3$, and photoelectrically converting the detected linear beam portion into a plurality of detected electric signals, an error generator 6A for generating a focus error signal FE indicating whether the laser beam focuses on the recording surface $S_2$, based on the detected electric signals from the photodetector 5A, a driver 7 for producing a drive signal based on the focus error signal FE from the error generator 7, and an actuator 8 responsive to the drive signal for controlling the position of the objective lens 4 with respect to the optical disc DK, i.e., the distance between the optical disk DK and the objective lens 4.

Another portion of the linear beam that has fallen on the surface $S_3$ is read as an RF signal indicative of the information recorded on the optical disc DK, and the RF signal is sent to an RF amplifier 9. The RF signal is amplified at a suitable gain by the RF amplifier 9, which applies the amplified RF signal to a signal demodulator (not shown).

Figure 4:
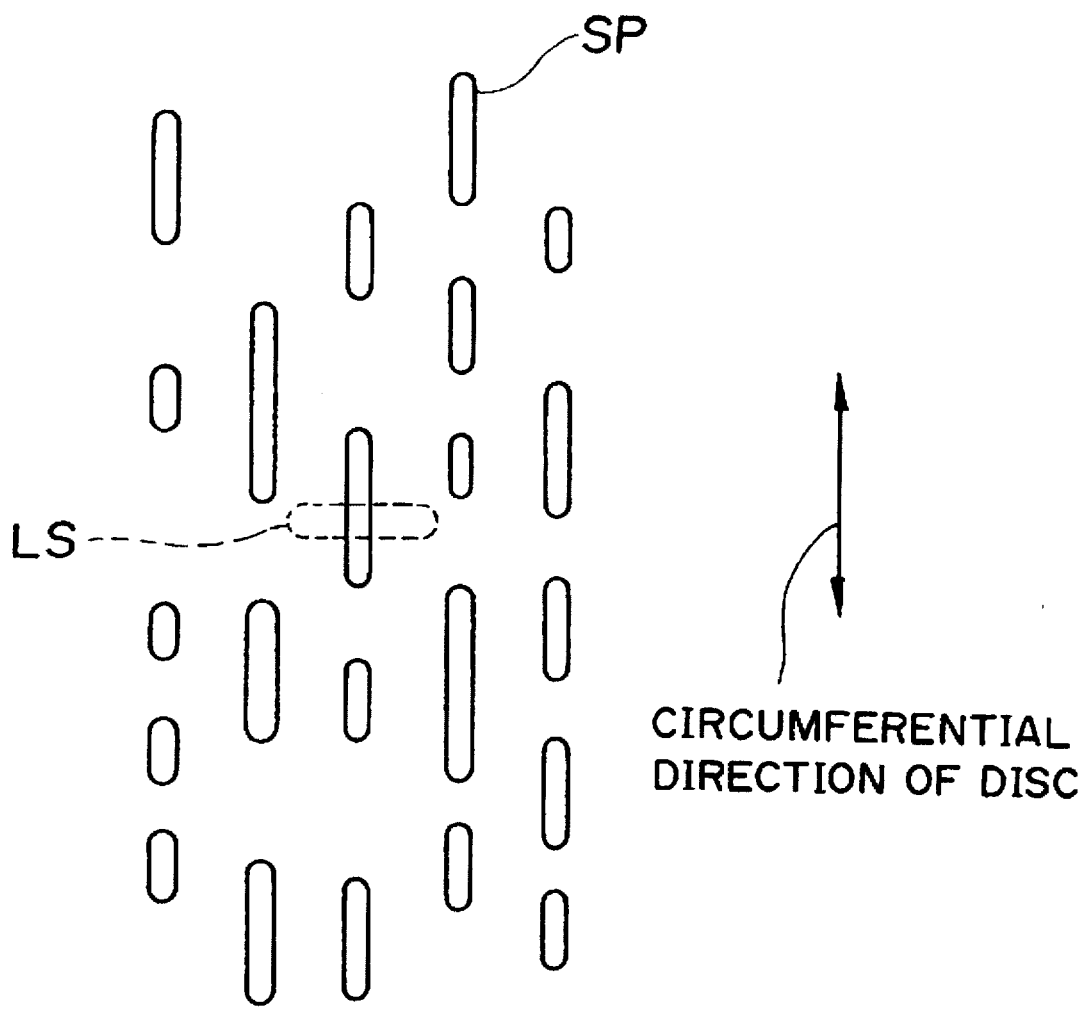
FIG. 4 is a diagram showing the relationship between signal pits and a linear beam spot on an optical disc for the focus control device according to the first embodiment.

FIG. 4 shows the relationship between signal pits SP and a linear beam spot LS on the optical disk DK, the linear beam spot LS being formed on the recording surface $S_2$ by the laser beam applied thereto. The linear beam spot LS extends linear 17 perpendicularly to a track direction, i.e., a circumferential direction, and covers only one track or row of signal pits SP but does not reach adjacent tracks.

Figure 5A:
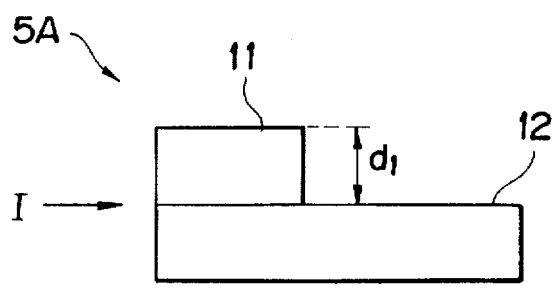
FIGS. 5(A), 5(B), and 5(C) are front elevational, plan, and side elevational views, respectively, of a photodetector in the focus control device according to the first embodiment.
Figure 5B:
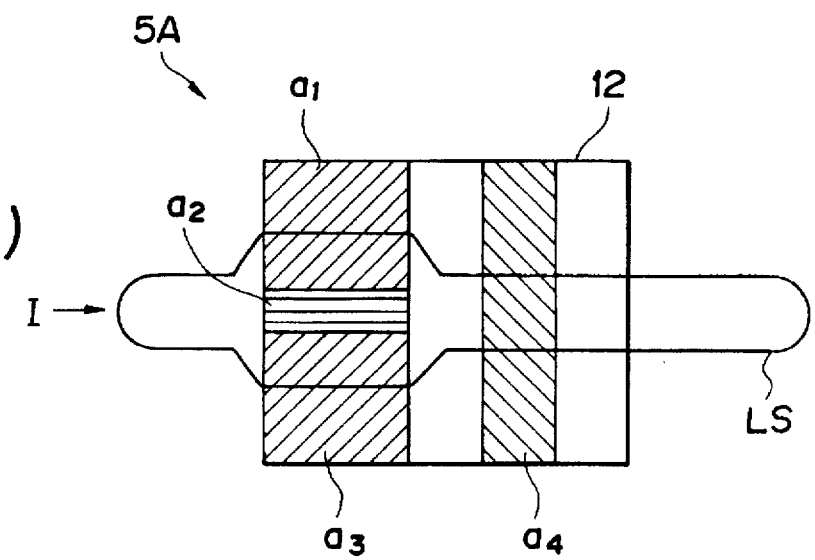
Figure 5C:
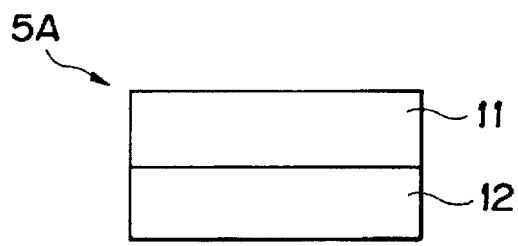

FIGS. 5(A), 5(B), and 5(C) show the photodetector 5A in detail. As shown in FIGS. 5(A), 5(B), and 5(C), the photodetector 5A includes a photodetector element 12 for detecting a linear beam spot LS reflected from the optical disc DE and a parallel flat glass plate 11 mounted on and covering a portion of the photodetector element 12. The photodetector element 12 has three photosensitive surfaces $a_1$, $a_2$, $a_3$ successively arranged across the photodetector element 12 at one end thereof and a single photosensitive surface $a_4$ extending across the photodetector element 12 and spaced from the three photosensitive surfaces $a_1$, $a_2$, $a_3$. The parallel flat glass plate 11 covers the three photosensitive surfaces $a_1$, $a_2$, $a_3$ in their entirety. The parallel flat glass plate 11 has a thickness $d_1$ and an absolute refractive index $n_1$ and an optical path $n_1 \times d_1$. The photosensitive surfaces $a_1$–$a_4$ photoelectrically convert the detected reflected linear beam spot LS into respective detected electric signals $I_1$–$I_4$. The signals $I_1$, $I_4$ $I_3$ are used to detect a focus error, and the signal represents an information signal indicative of the information recorded on the optical disc DK. As shown in FIG. 5(B), the reflected linear beam spot LS from the optical disc DK is applied across the photosensitive surfaces $a_1$, $a_2$, $a_3$ and the photosensitive surface $a_4$.

Operation of the focus control device according to the first embodiment will be described below with reference to FIGS. 6(A1), 6(B1), 6(C1), 6(A2), 6(B2), 6(C2), and 7.

Figure 6:
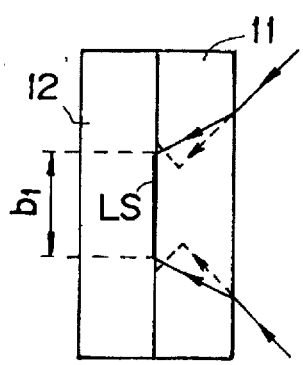
FIGS. 6(A1), 6(B1), and 6(C1) are side elevational views showing a linear beam applied to the photodetector shown in FIGS. 5(A), 5(B), and 5(C)
Figure 6:
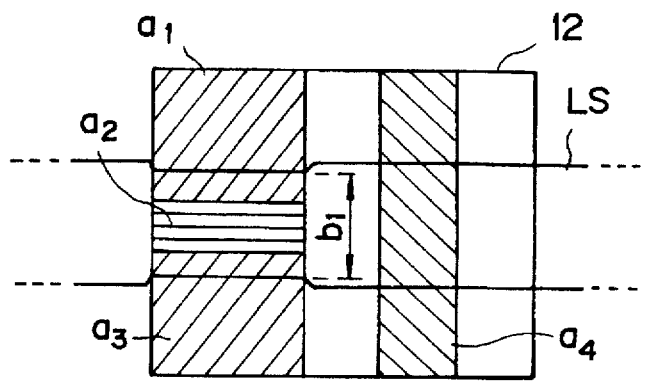
Figure 6:
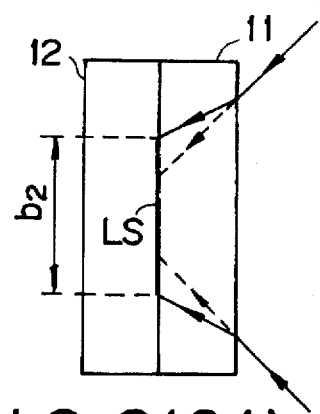
Figure 6:
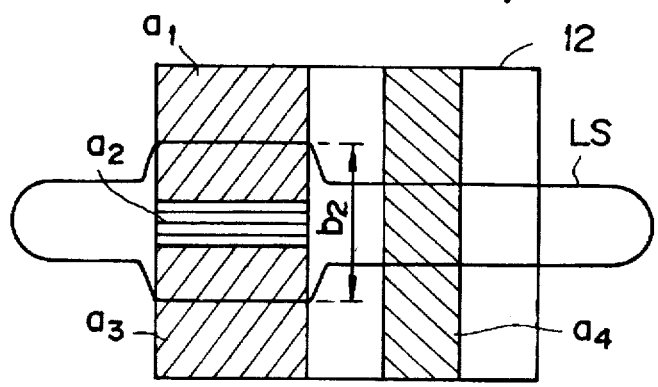
Figure 6:
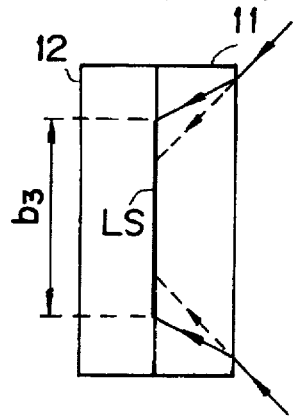
Figure 6:
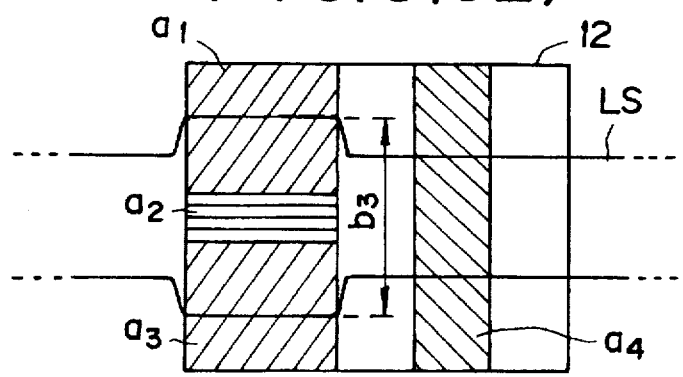

FIGS. 6(A1), 6(B1), and 6(C1) show the reflected linear beam LS that is applied to the photodetector 5A, as viewed in the direction indicated by the arrow I in FIGS. 5(A) and 5(B). FIGS. 6(A2), 6(B2), and 6(C2) show the reflected linear beam spot LS that is applied to the photodetector 5A, as viewed in plan. In FIGS. 6(A1) and 6(A2), the reflected linear beam spot LS is shown as being applied to the photodetector 5A when the distance between the objective lens 4 and the optical disc DK is shorter than the focal length of the objective lens 4, i.e., the objective lens 4 is too close to the optical disc DK. In FIGS. 6(B1) and 6(B2), the reflected linear beam spot LS is shown as being applied to the photodetector 5A when the distance between the objective lens 4 and the optical disc DK is equal to the focal length of the objective lens 4. In FIGS. 6(C1) and 6(C2), the reflected linear beam spot LS is shown as being applied to the photodetector 5A when the distance between the objective lens 4 and the optical disc DK is longer than the focal length of the objective lens 4, i.e., the objective lens 4 is too far from the optical disc DK. In FIGS. 6(A1), 6(B1), and 6(C1), the reflected linear beam LS applied to the photodetector 5A travels through the parallel flat glass plate 11 along a trajectory indicated by the solid-line arrows, and travels outside of the parallel flat glass plate 11 along a trajectory indicated by the broken-line arrows.

Figure 7:
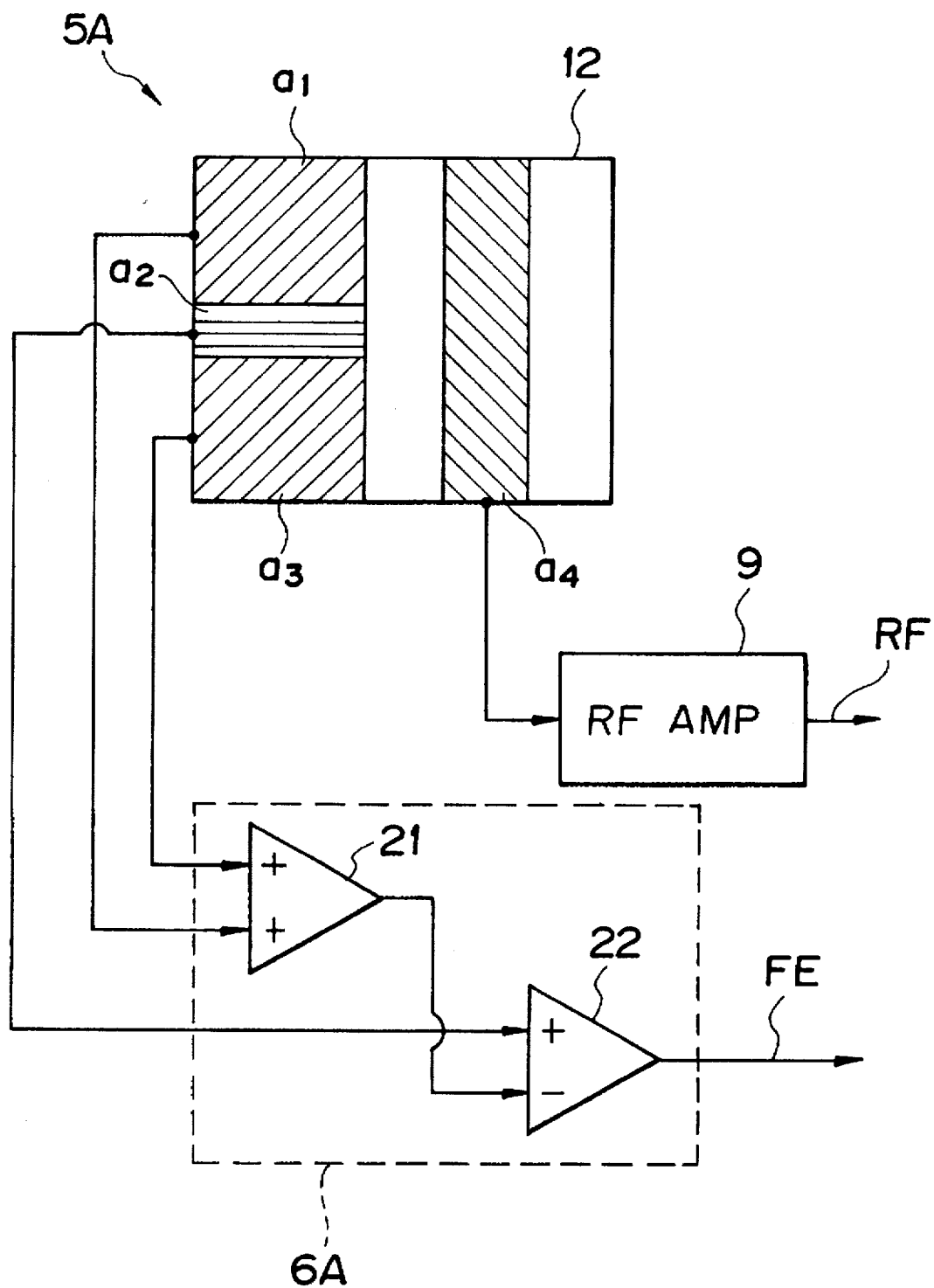
FIG. 7 is a schematic view, partly in block form, of the photodetector, an error generator, and an RF amplifier in the focus control device according to the first embodiment.

FIG. 7 shows the photodetector 5A, the error generator 6A connected to the photodetector 5A, and the RF amplifier 9 also connected to the photodetector 5A. As shown in FIG. 7, the error generator 6A has an adder 21 and a subtractor 22. The adder 21 has one input terminal connected to the photosensitive surface $a_1$ and the other input terminal connected to the photosensitive surface $a_3$. The subtractor 22 has a positive input terminal connected to the photosensitive surface $a_2$ and a negative input terminal connected to the output terminal of the adder 21. Therefore, the error generator 6A produces an output signal FE representing FE=$I_2$–($I_1$+$I_3$) as an output signal from the output terminal of the subtractor 22.

The photosensitive surfaces $a_1$, $a_2$, $a_3$ are designed such that when the laser beam spot is focused on the recording surface $S_2$ of the optical disc DK, i.e., when the distance between the objective lens 4 and the optical disc DK is equal to the focal length of the objective lens 4, as shown in FIGS. 6(B1) and 6(B2), the respective detected signals $I_1$, $I_2$, $I_3$ satisfy the following equations:

$$FE = I_2 - (I_1 + I_3) = ) \quad (1)$$

$$\text{and } I_1 = I_3 \quad (2).$$

Then, when the objective lens 4 is too close to the optical disc DK and hence the reflected linear beam LS travels as shown in FIGS. 6(A1) and 6(A2), the detected signal $I_2$ from the photosensitive surface $a_3$ becomes greater than the sum of the detected signals $I_1$, $I_3$ from the photosensitive surfaces $a_1$, $a_3$ because of the refraction by the parallel flat glass plate 11. Therefore, the detected signals $I_1$, $I_2$, $I_3$ satisfy the following equations:

$$FE = I_2 - (I_1 + I_3) > 0 \quad (3).$$

When the objective lens 4 is too far from the optical disc DK and hence the reflected linear beam LS travels as shown in FIGS. 6(C1) and 6(C2), the detected signal $I_2$ from the photosensitive surface $a_2$ becomes smaller than the sum of the detected signals $I_1$, $I_3$ from the photosensitive surfaces $a_1$, $a_3$ because of the refraction by the parallel flat glass plate 11. Therefore, the detected signals $I_1$, $I_2$, $I_3$ satisfy the following equations:

$$FE = I_2 - (I_1 + I_3) < 0 \quad (4).$$

Accordingly, the output signal from the error generator 6A, which is indicated by:

$$FE = I_2 - (I_1 + I_3)$$

can be employed as a focus error signal.

This is because the parallel flat glass plate 11 having a predetermined optical path and a refractive action covers the entire photosensitive surfaces $a_1$, $a_2$, $a_3$, causing the reflected linear beam spot LS to have widths $b_1$, $b_2$, $b_3$ ($b_1 < b_2 < b_3$), respectively, on the photosensitive surfaces when the distance between the objective lens 4 and the optical disc DK is shorter than, equal to, and longer than, respectively, the focal length of the objective lens 4. If the photosensitive surfaces $a_1$, $a_2$, $a_3$ were not covered with the parallel flat glass plate 11, then the reflected linear beam spot LS would fall on the photosensitive surfaces $a_1$, $a_2$, $a_3$ along the trajectory as indicated by the broken lines in FIGS. 6(A1), 6(B1), and 6(C1). Although the output signal FE is FE =0 when the laser beam spot is focused on the optical disc DK, the output signal FE would be FE<0 when the laser beam spot is out of focus on the optical disc DK irrespective of whether it is overfocused or underfocused, failing to determine whether the objective lens 4 is too Close to or far from the optical disc DK.

Figure 8A:
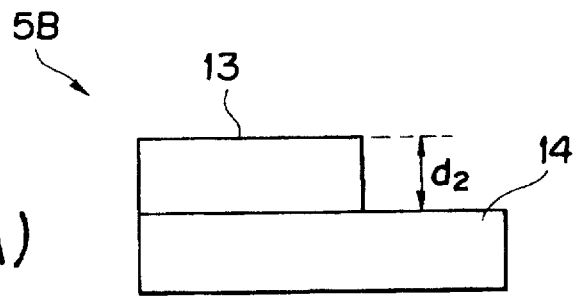
FIGS. 8(A) and 8(B) are front elevational and plan views of a photodetector for use in a focus control device according to a second embodiment of the present invention.
Figure 8B:
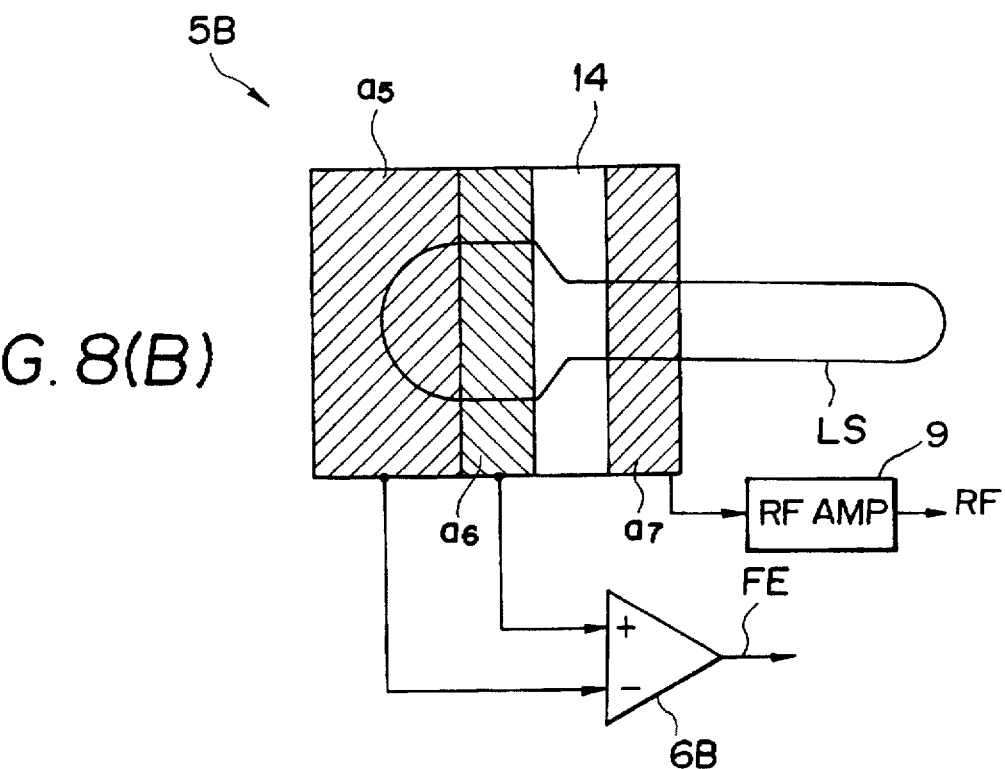

2nd Embodiment:

FIGS. 8(A) and 8(B) show a focus control device according to a second embodiment of the present invention. The focus control device according to the second embodiment is similar to the focus control device according to the first embodiment except for a photodetector and an error generator. Therefore, only a photodetector and an error generator in the focus control device according to the second embodiment are shown in FIGS. 8(A) and 8(B).

As shown in FIGS. 8(A) and 8(B), the photodetector, generally denoted at 5B, includes a photodetector element 14 for detecting a linear beam reflected from the optical disc DK and a parallel flat glass plate 13 mounted on and covering a portion of the photodetector element 14. The photodetector element 14 has two parallel photosensitive surfaces $a_5$, $a_6$ extending across the photodetector element 14 at one end thereof and a single photosensitive surface $a_7$ extending across the photodetector element 14 at the opposite end thereof and spaced from the successive photosensitive surfaces $a_5$, $a_6$. The parallel flat glass plate 13 covers the adjoining photosensitive surfaces $a_5$, $a_6$ in their entirety. The parallel flat glass plate 13 has a thickness $d_2$ and an absolute refractive index $n_2$ and an optical path $n_2 \times d_2$. The photosensitive surfaces $a_5$–$a_7$ photoelectrically convert the detected reflected beam spot LS into respective detected electric signals $I_1-I_7$. The signals $I_5$, $I_6$ are used to detect a focus error, and the signal $I_7$ represents an information signal indicative of the information recorded on the optical disc DK.

.Operation of the focus control device according to the second embodiment will be described below with reference to FIGS. 8(B).

In FIG. 8(B), the error generator, denoted at 6B, includes a subtractor having a positive input terminal connected to the photosensitive surface $a_6$ and a negative input terminal connected to the photosensitive surface $a_5$. The photosensitive surface $a_7$ is connected to the RF amplifier 9. As shown in FIG. 8(B), an end of the reflected linear beam from the optical disc DK is applied to the photosensitive surfaces $a_5$, $a_6$.

When the laser beam spot applied to the optical disc DK is focused on the recording surface $S_2$, the output signal FE from the error generator 6B satisfy the following equation:

$$FE=I_6-I_5=0 \qquad (5)$$

When the laser beam spot applied to the optical disc DK is out of focus on the recording surface $S_2$ because the objective lens 4 is too close to or too far from the optical disc DK, the output signal FE from the error generator 6B becomes FE>0 or FE<0, respectively, due to the refraction by the parallel flat glass plate 13. Consequently, the output signal FE from the error generator 6B can be used as a focus error signal for controlling the objective lens 4 to focus on the recording surface $S_2$.

3rd Embodiment:

A focus control device according to a third embodiment of the present invention will be described below with reference to FIGS. 9(A), 9(B) through 11. The focus control device according to the third embodiment is similar to the focus control device according to the first embodiment except for a photodetector and an error generator.

Figure 9A:
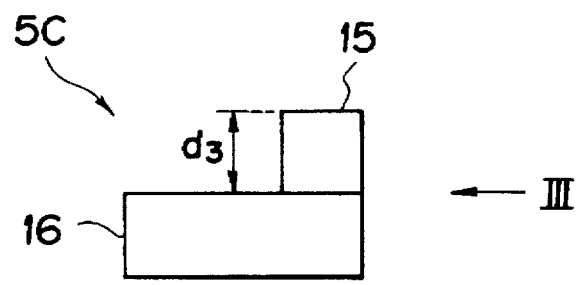
FIGS. 9(A) and 9(B) are front elevational and plan views of a photodetector for use in a focus control device according to a third embodiment of the present invention.
Figure 9B:
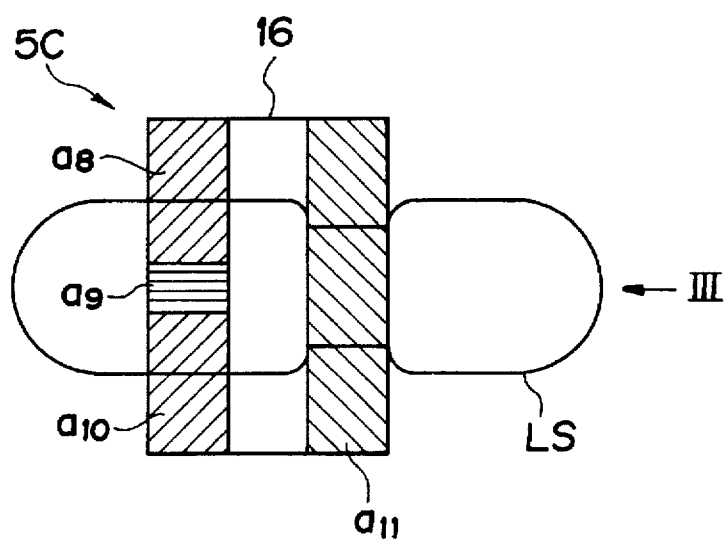

As shown in FIGS. 9(A) and 9(B), the photodetector, generally denoted at 5C, includes a photodetector element 16 for detecting a linear beam LS reflected from the optical disc DK and a parallel flat glass plate 15 mounted on and covering a portion of the photodetector element 16. The photodetector element 16 has three photosensitive surfaces $a_8$, $a_8$, $a_{10}$ successively arranged across the photodetector element 16 at one end thereof and a single photosensitive surface $a_{11}$ extending across the photodetector element 16 at the opposite end thereof and spaced from the three photosensitive surfaces $a_8$, $a_9$, $a_{10}$. The parallel flat glass plate 15 covers the single photosensitive surface $a_{11}$ in its entirety. The parallel flat glass plate 15 has a thickness $d_3$ and an absolute refractive index $n_3$ and an optical path $n_3 \times d_3$. The photosensitive surfaces $a_8-a_{11}$ photoelectrically convert the detected reflected beam spot LS into respective detected electric signals $I_8-I_{11}$. The signals $I_9-I_{10}$ are used to detect a focus error, and the signal $I_{11}$ represents an information signal indicative of the information recorded on the optical disc DK.

As shown in FIG. 9(B), the reflected linear beam spot LS from the optical disc DK is applied across the photosensitive surfaces $a_8$, $a_8$, $a_{10}$ and the photosensitive surface $a_{10}$.

Operation of the focus control device according to the third embodiment will be described below with reference to FIGS. 10(A1), 10(B1), 10(C1), 10(A2), 10(B2), 10(C2), and 11.

FIGS. 10(A1), 10(B1), and 10(C1) show the reflected linear beam spot LS that is applied to the photodetector 5C, as viewed in the direction indicated by the arrow III in FIGS. 9(A) and 9(B). FIGS. 10(A2), 10(B2), and 10(C2) show the reflected linear beam spot LS that is applied to the photodetector 5C, as viewed in plan. In FIGS. 10(A1) and 10(A2), the reflected linear beam spot LS is shown as being applied to the photodetector 5C when the distance between the objective lens 4 and the optical disc DK is shorter than the focal length of the objective lens 4, i.e., the objective lens 4 is too close to the optical disc DK. In FIGS. 10(B1) and 10(B2), the reflected linear beam spot LS is shown as being applied to the photodetector 5C when the distance between the objective lens 4 and the optical disc DK is equal to the focal length of the objective lens 4. In FIGS. 10(C1) and 10(C2), the reflected linear beam spot LS is shown as being applied to the photodetector 5C when the distance between the objective lens 4 and the optical disc DK is longer than the focal length of the objective lens 4, i.e., the objective lens 4 is too far from the optical disc DK. In FIGS. 10(A1), 10(B1), and 10(C1), the reflected linear beam spot LS applied to the photodetector 5C travels through the parallel flat glass plate 11 along a trajectory indicated by the solid-line arrows, and travels outside of the parallel flat glass plate 15 along a trajectory indicated by the broken-line arrows.

FIG. 11 shows the photodetector 5C, an error generator 6C connected to the photodetector 5C, and the RF amplifier 9 also connected to the photodetector 5C. As shown in FIG. 11, the error generator 6C has two adders 21, 23, two subtractors 22, 24, and two multipliers 25, 26. The adder 21 has one input terminal connected to the photosensitive surface $a_8$ and the other input terminal connected to the photosensitive surface $a_{10}$. The output terminal of the adder 21 is connected to an input terminal of the multiplier 26 and also connected to a negative input terminal of the subtractor 22. The multiplier 25 has an input terminal connected to the photosensitive surface $a_9$ and an output terminal connected to one input terminal of the adder 23 whose other input terminal is connected to the output terminal of the multiplier 26. The subtractor 22 has a positive input terminal connected to the photosensitive surface $a_9$. The subtractor 24 has a positive input terminal connected to the photosensitive surface $a_{11}$ and a negative input terminal to the output terminal of the adder 23. Therefore, the error generator 6C produces an output signal $FE_1$ representing $FE_1=I_9-(I_8+I_{10})$ as an output signal from the output terminal of the subtractor 24, and an output signal $FE_2$ representing $FE_2=I_{11}-(b \times I_8+a \times I_9+b \times I_{10})$ as an output signal from the output terminal of the subtractor 22 where a, b are real constants.

The photosensitive surfaces $a_8$, $a_9$, $a_{10}$ are designed and the constants a, b are selected such that when the laser beam spot is focused on the recording surface $S_2$ of the optical disc DK, i.e., when the distance between the objective lens 4 and the optical disc DK is equal to the focal length of the objective lens 4, as shown in FIGS. 10(B1) and 10(B2), the respective detected signals $I_1$, $I_2$, $I_3$ satisfy the following equations:

$$FE_1=I_9-(I_8+I_{10})=0 \qquad (6)$$

$$\text{and } FE_2=I_{11}-(b \times I_8+a \times I_9+b \times I_{10})=0 \qquad (7).$$

Then, when the objective lens 4 is too close to the optical disc DK and hence the reflected linear beam spot LS travels as shown in FIGS. 10(A1) and 10(A2), or when the objective lens 4 is too far from the optical disc DK and hence the reflected linear beam spot LS travels as shown in FIGS. 10(C1) and 10(C2), it can be determined that the laser beam spot LS on the optical disc DK is out of focus because the objective lens 4 is too close to or too far from the optical disc DK, based on a combination of the negative or positive values of the output signals $FE_1$, $FE_2$ because of the refraction by the parallel flat glass plate 15. Therefore, the output signals $FE_1$, $FE_2$ from the error generator 6C, which are indicated respectively by:

$$FE_1=I_9-(I_8+I_{10})=0$$

$$\text{and } FE_2=I_{11}-(b \times I_8+a \times I_9+b \times I_{10})$$

can be employed as focus error signals.

This is because the parallel flat glass plate 15 having a predetermined optical path and a refractive action covers the entire photosensitive surface $a_{11}$, causing the reflected linear beam spot LS to have widths $b_7$, $b_8$, $b_9$, ($b_7<b_8<b_9$), respectively, on the photosensitive surface $a_{11}$ when the distance between the objective lens 4 and the optical disc DK is shorter than, equal to, and longer than, respectively, the focal length of the objective lens 4.

Figure 12:
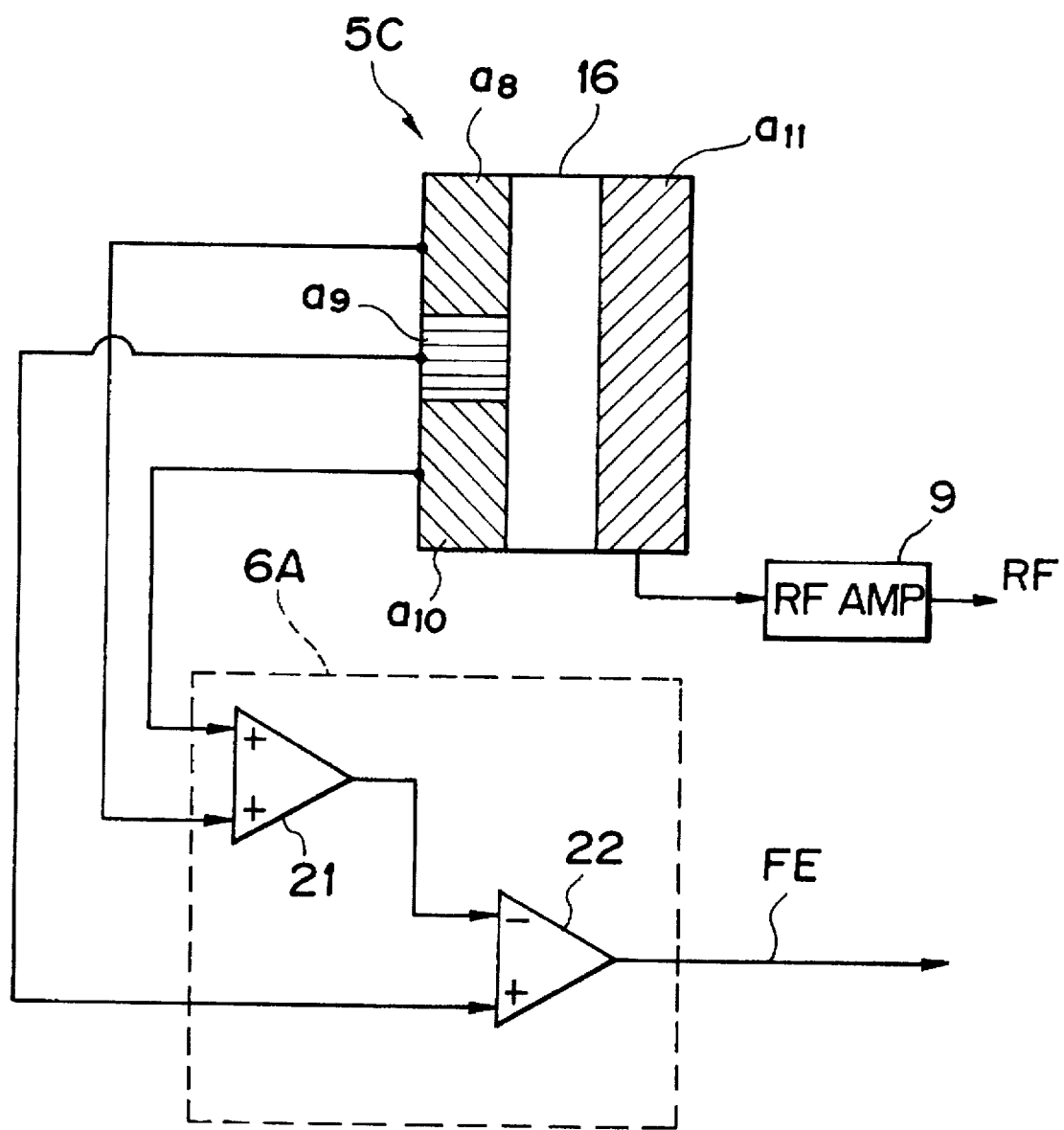
FIG. 12 is a schematic view of a photodetector and an error generator for use in a focus control device according to a fourth embodiment of the present invention.
Figure 13:
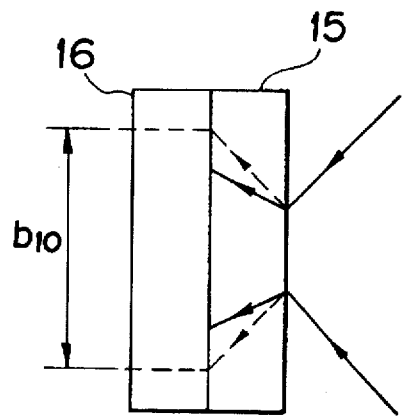
FIGS. 13(A1), 13(B1), and 13(C1) are side elevational views showing a linear beam applied to the photodetector shown in FIG. 12.
Figure 13:
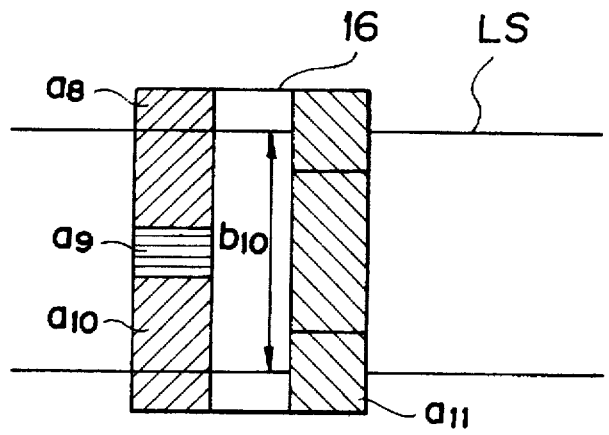
Figure 13:
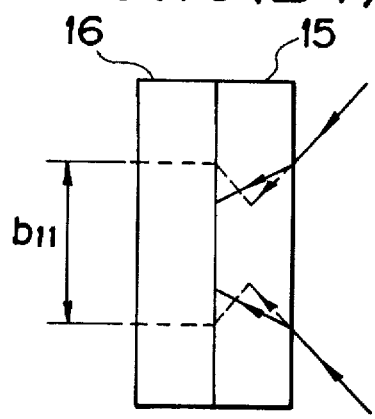
Figure 13:
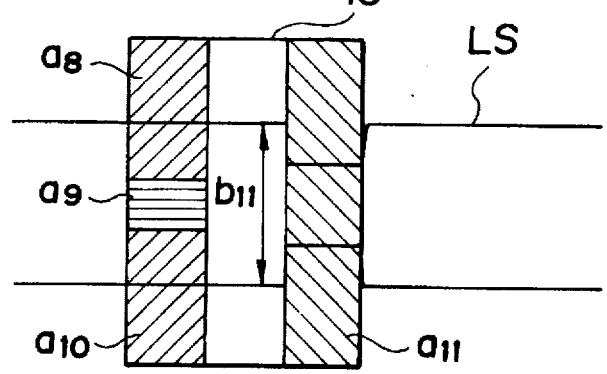
Figure 13:
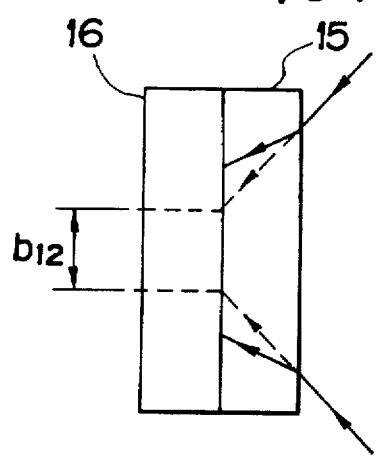
Figure 13:
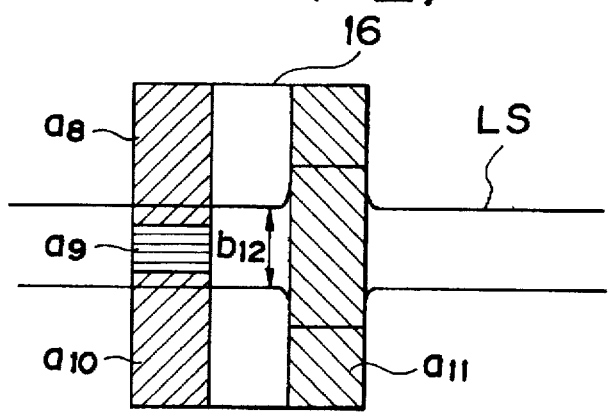

4th Embodiment:

In a fourth embodiment, the photodetector 5C according to the third embodiment may be connected, as shown in FIG. 12, to the error generator 6A according to the first embodiment shown in FIG. 7. Specifically, the photosensitive surface $a_8$ is connected to one input terminal of the adder 21, the photosensitive surface $a_9$ is connected to the positive input terminal of the subtractor 22, and the photosensitive surface $a_{10}$ is connected to the other input terminal of the adder 21 whose output terminal is connected to the negative input terminal of the subtractor 22. The linear beam spot LS on the optical disc DK is focused when the reflected linear beam spot LS is applied to the photodetector 5C as shown in FIGS. 13(B1) and 13(B2). Insofar as the width $b_{12}$ of the reflected linear beam spot LS, which is applied to the photosensitive surface $a_8$, $a_9$, $a_{10}$ as shown in FIGS. 13(C1) and 13(C2) when the linear beam spot LS on the optical disc DK is out of focus because the objective lens 4 is too far from the optical disc DK, is smaller than the width $b_{11}$ ($b_{11}>b_{12}$) of the reflected linear beam spot LS, which is applied to the photosensitive surface $a_8$, $a_9$, $a_{10}$ as shown in FIGS. 13(B1) and 13(B2) when the linear beam spot LS on the optical disc DK is focused, the width $b_{10}$ of the reflected linear beam spot LS, which is applied to the photosensitive surface $a_8$, $a_9$, $a_{10}$ as shown in FIGS. 13(A1) and 13(A2) when the linear beam spot LS on the optical disc DK is out of focus because the objective lens 4 is too close to the optical disc DK, is larger than the widths $b_{11}$, $b_{12}$ ($b_{10}>b_{11}>b_{12}$). Therefore, the output signal from the error generator 6A, which is indicated by:

$$FE=I_2-(I_1+I_3)$$

can be employed as a focus error signal.

Figure 14A:
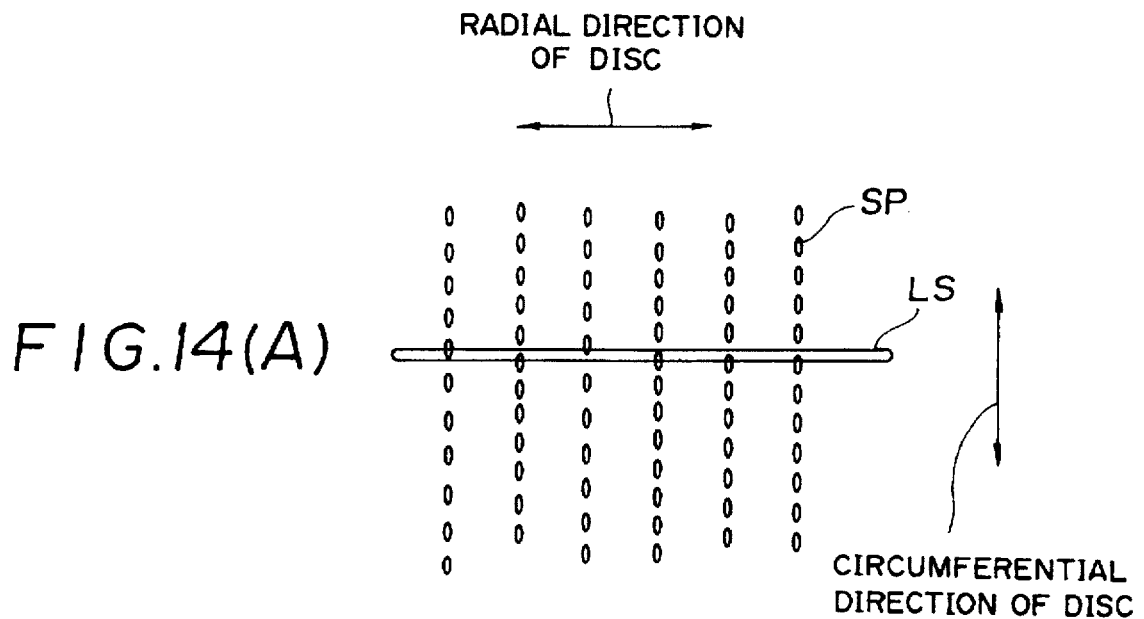
FIG. 14(A) is a diagram showing the relationship between signal pits and a linear beam spot on an optical disc for a focus control device according to a fifth embodiment of the present invention.
Figure 14B:
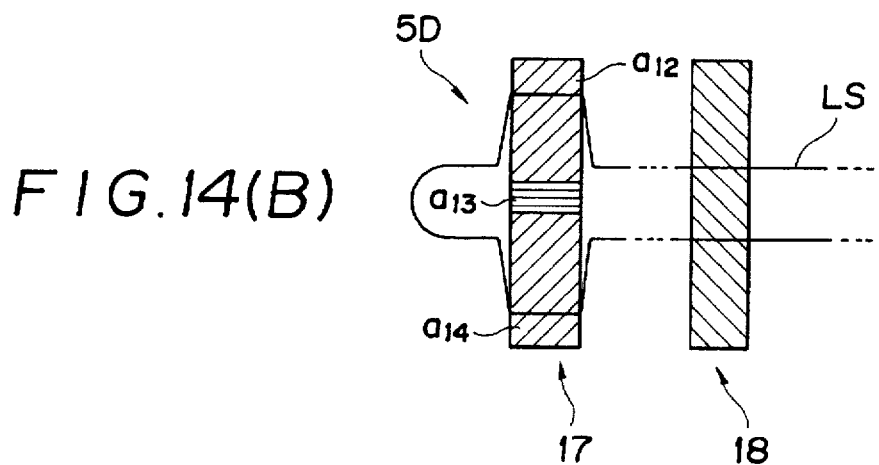
FIG. 14(B) is a plan view of a photodetector for use in the focus control device according to the fifth embodiment of the present invention.

5th Embodiment:

In each of the first through fourth embodiments described above, the linear beam spot LS is applied to the optical disc DK so that it does not fall on adjacent tracks at the same time, as shown in FIG. 4. According to a fifth embodiment, however, a longer linear beam spot LS is applied to the optical disc across a plurality of tracks of signal pits SP, as shown in FIG. 14(A). According to the fifth embodiment, as shown in FIG. 14(B), a photodetector 5D has a photosensitive surface 18 for reading an information signal recorded on the optical disc DK, and a photodetector unit 17 composed of three photosensitive surfaces $a_{12}$, $a_{13}$, $a_{14}$ spaced from the photosensitive surface 18 for producing respective output signals which can be processed into a focus error signal. The three photosensitive surface $a_{12}$, $a_{13}$, $a_{14}$ are covered with a parallel flat glass plate as with the first embodiment. If laser beam reflections from other tracks than those tracks from which a focus error signal is to be derived are also applied to the photodetector unit 17, then the photodetector unit 17 may be arranged such that it cannot detect signals in a high-frequency range.

Figure 15:
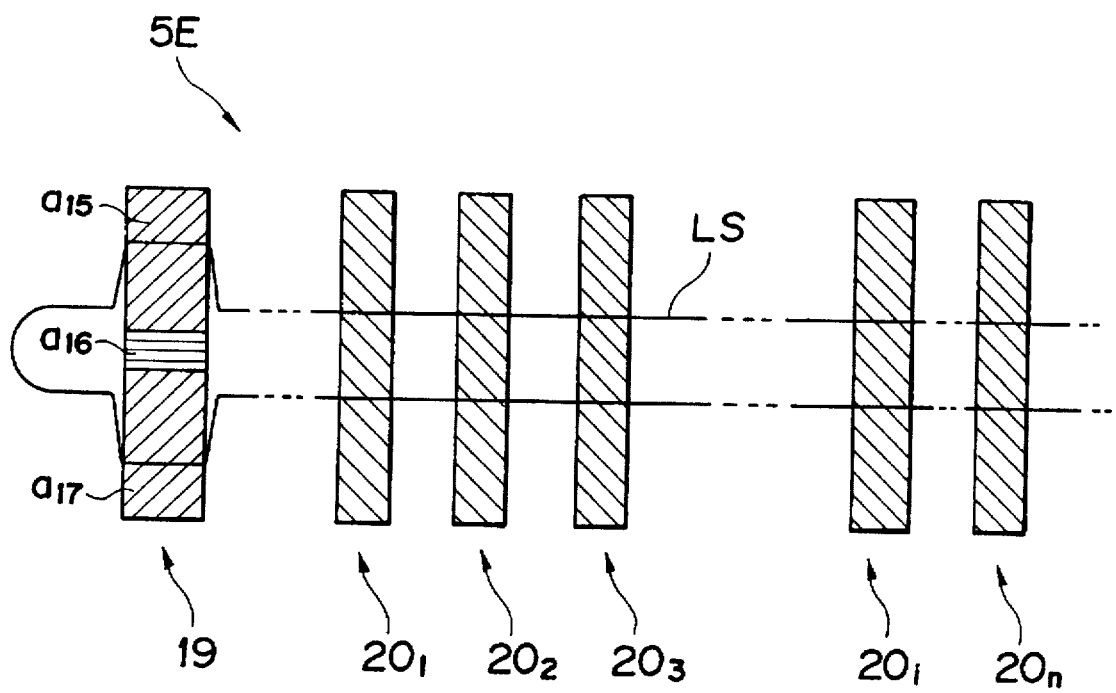
FIG. 15 is a plan view of a photodetector for use in a focus control device according to a sixth embodiment of the present invention.

6th Embodiment:

As shown in FIG. 15, a photodetector 5E according to a sixth embodiment of the present invention has a plurality of juxtaposed photosensitive surfaces $20_1$–$20_n$ for reading information signals from the optical disc DK using a very long linear beam spot LS applied to the optical disc DK. The photodetector 5E is thus capable of reading a plurality of tracks on the optical disc DK at the same time. The photodetector 5E also has a photodetector unit 19 composed of three adjoining photosensitive surfaces $a_{15}$, $a_{16}$, $a_{17}$ spaced from the photosensitive surfaces $20_1$–$20_n$. The three photosensitive surfaces $a_{15}$, $a_{16}$, $a_{17}$ are covered with a parallel flat glass plate as with the first embodiment.

In the above embodiments, certain photosensitive surfaces of the photodetector are covered with a parallel flat glass plate. However, they may be covered with a lens, a Fresnel lens, a cylindrical lens, or an optical element with a varying distribution of refractive indexes. Such a lens or an optical element may be spaced from the photosensitive surfaces.

Although certain preferred embodiments of the present invention have been shown and described in detail, it should be understood that various changes and modifications may be made therein without departing from the scope of the appended claims.

What is claimed is:

1. A focus control device for use in an optical pickup for reading information recorded on recording tracks of a recording surface of an optical information storage medium, comprising:

a light beam source for emitting a light beam;

an optical system including an objective lens for converging said light beam as an image which extends linearly on the recording surface perpendicular to the tracks and collecting and emitting a light beam reflected from said recording surface;

refracting means for refracting the reflected light beam emitted from said optical system;

photodetecting means having a plurality of photosensitive surfaces for photoelectrically converting an image formed from the light beam applied thereto from said refracting means into a plurality of respective detected signals, wherein said plurality of photosensitive surfaces comprises three photosensitive elements for providing first through third of said detected signals and a fourth photosensitive element for providing a fourth one of said detected signals as only an RF signal;

processing means for processing said first through third of said detected signals from said photodetecting means into a focus error signal indicative of whether said image is focused on said recording surface at the focal point of said objective lens; and control means responsive to said focus error signal for controlling said objective lens positionally with respect to the optical information storage medium to focus said image on said recording surface.

2. A focus control device according to claim 1, wherein said photodetecting means comprises a photodetector element having said photosensitive surfaces thereon.

3. A focus control device according to claim 2, wherein said a photodetector element comprises a first, a second and a third photosensitive surfaces for producing a first, a second and a third detected signals, and said focus error signal comprises a difference between said first detected signal and the sum of said second and third detected signals.

4. A focus control device according to claim 3, wherein said photosensitive surfaces extend parallel to each other in a radial direction of said optical information storage medium across said photodetector element, and said first photosensitive surface is disposed between said second photosensitive surface and said third photosensitive surface.

5. A focus control device according to claim 2, wherein said photodetector element comprises a first and a second photosensitive surfaces for producing a first and a second detected signals, and said focus error signal comprises a difference between said first detected signal and said second detected signal.

6. A focus control device according to claim 5, wherein said photosensitive surfaces extending parallel to each other across said photodetector element in a circumferential direction of said optical information storage medium.

7. A focus control device according to claim 1, wherein said refracting means comprising a flat glass plate disposed on said photosensitive surfaces in covering relationship thereto.

8. A focus control device according to claim 1, wherein said refracting means comprising a flat glass plate disposed on said photodetector element in spaced relationship to said photosensitive surfaces.

9. A focus control device according to claim 1, wherein said refracting means refracts only a portion of the reflected light beam emitted from said optical system.

10. A focus control device according to claim 1, wherein said image extends across one or more of said tracks.

11. A focus control device according to claim 1, wherein said image extends across a plurality of said tracks.

12. A focus control device according to claim 1, wherein said photodetecting means is disposed within a positional range where a focal point of said objective lens moves according to a movement of said objective lens with respect to said recording surface.

13. A focus control device according to claim 1, wherein said refracting means is disposed on said photosensitive surfaces.

14. A focus control device for use in an optical pickup for reading information recorded on recording tracks of a recording surface of an optical information storage medium, comprising:

a light beam source for emitting a light beam;

an optical system including an objective lens for converging said light beam as an image which extends linearly on the recording surface perpendicular to the tracks, and collecting and emitting a light beam reflected from said recording surface;

refracting means for refracting the reflected light beam emitted from said optical system so as to vary a width of the light beam in one direction;

photodetecting means having a plurality of photosensitive surfaces for photoelectrically converting the light beam applied thereto from said refracting means into a plurality of respective detected signals, wherein said plurality of photosensitive surfaces comprises three photosensitive elements for providing first through third of said detected signals and a fourth photosensitive element for providing a fourth one of said detected signals as only an RF signal;

processing means for processing said first through third of said detected signals from said photodetecting means into a focus error signal indicative of whether said image is focused on said recording surface at the focal point of said objective lens; and control means responsive to said focus error signal for controlling said objective lens positionally with respect to the optical information storage medium to focus said image on said recording surface.

15. A focus control device according to claim 14, wherein said one direction is a direction perpendicular to a longitudinal axis of the light beam.

16. A focus control device according to claim 14, wherein said plurality of photosensitive surfaces are arranged in a line in said one direction.

17. A focus control device according to claim 14, wherein said refracting means refracts only a portion of the reflected light beam emitted from said optical system.

18. A focus control device according to claim 14, wherein said image extends across one or more of said tracks.

19. A focus control device according to claim 14, wherein said image extends across a plurality of said tracks.

20. A focus control device according to claim 14, wherein said photodetecting means is disposed within a positional range where a focal point of said objective lens moves according to a movement of said objective lens with respect to said recording surface.

21. A focus control device according to claim 14, wherein said refracting means is disposed on said photosensitive surfaces.

* * * * *